June 22, 1937.    L. E. LA BRIE    2,084,400

BRAKE

Filed July 16, 1934    5 Sheets-Sheet 1

INVENTOR.
LUDGER E. LaBRIE
BY Jerome R. Cox
ATTORNEY.

June 22, 1937.  L. E. LA BRIE  2,084,400
BRAKE
Filed July 16, 1934   5 Sheets-Sheet 2

INVENTOR.
LUDGER E. LaBRIE
BY Jerome R. Cox
ATTORNEY.

June 22, 1937.  L. E. LA BRIE  2,084,400
BRAKE
Filed July 16, 1934  5 Sheets-Sheet 3

INVENTOR.
LUDGER E. LaBRIE
BY Jerome R. Cox
ATTORNEY.

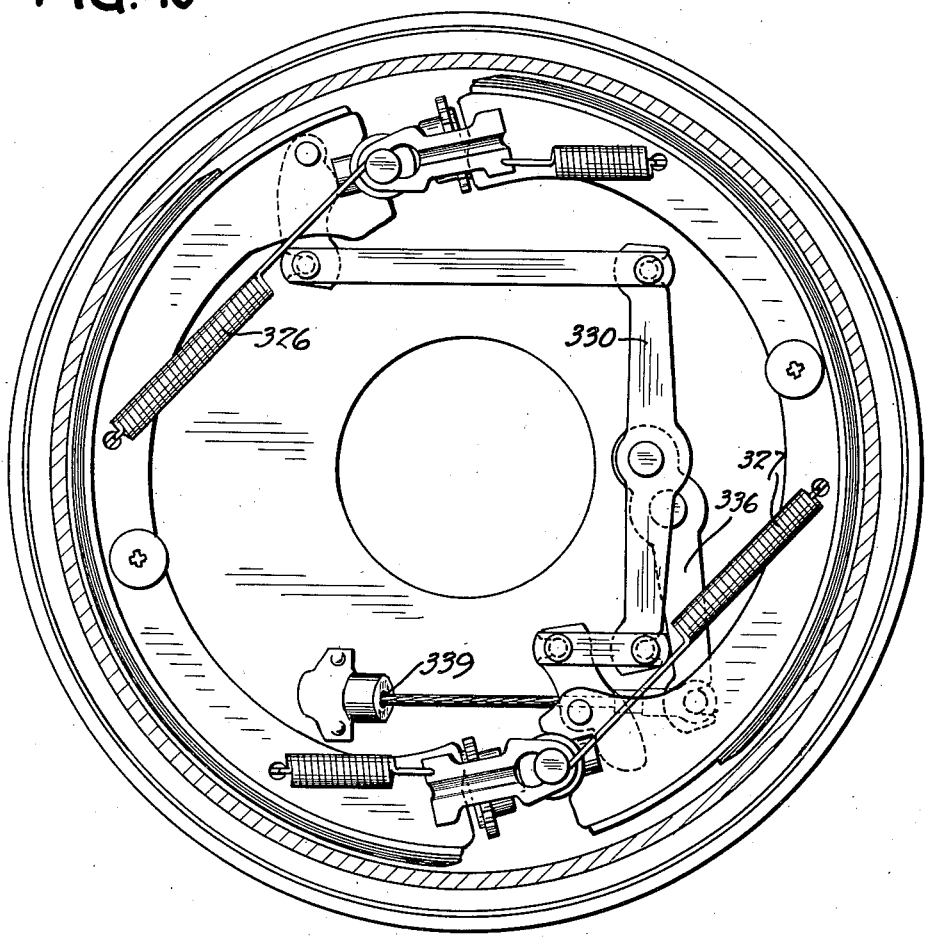

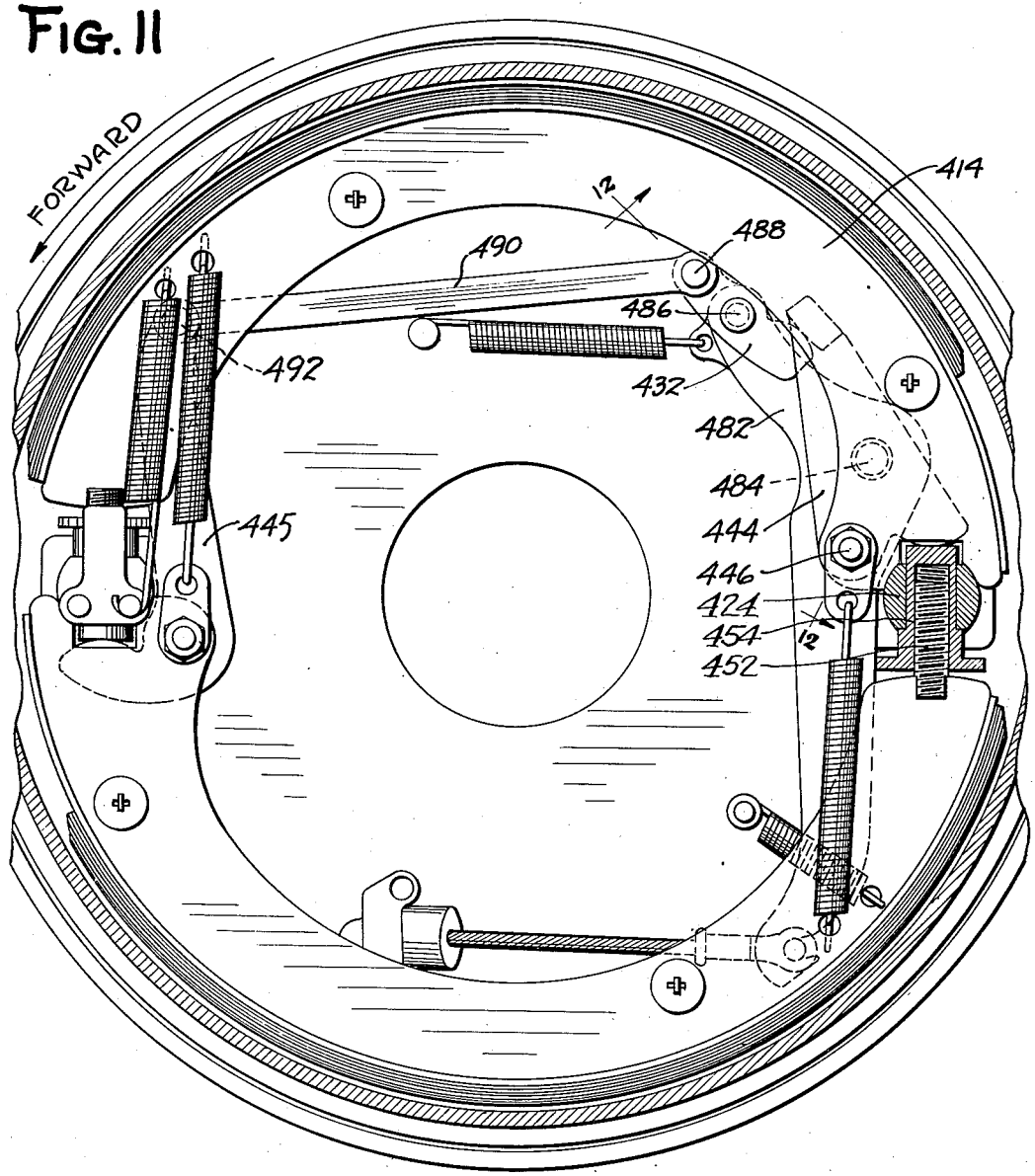
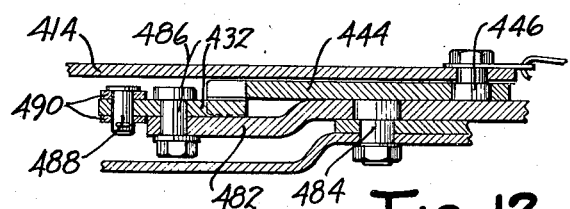

Patented June 22, 1937

2,084,400

UNITED STATES PATENT OFFICE 2,084,400

BRAKE

Ludger E. La Brie, South Bend, Ind., assignor to Bendix Products Corporation, South Bend, Ind., a corporation of Indiana Application July 16, 1934, Serial No. 735,347

19 Claims. (Cl. 188—78)

This invention relates to brakes, and is illustrated as embodied in several different constructions of internal expanding brakes for automobiles and the like.

An object of the invention is to increase the power of brakes of this general type, by taking full advantage of the self-energizing effect of the brake shoes, while retaining equalization of applying force transmitted to the various shoes of the same brake and while retaining full controllability by avoiding compounding the effect of one shoe on another, in a simple and effective and preferably fully-inclosed construction, and another object is to arrange such a construction for ready adjustment to compensate for wear.

The illustrated brakes are of the type in which there are two independent shoes, each of which anchors at one end when the drum is turning in one direction and at the other end when the drum is turning in the other direction, thus taking maximum advantage of the self-energizing effect of the shoes. The shoes are shown provided with fixed anchors at opposite sides of the brake between the ends of the shoes, and preferably mounted on a backing plate which cooperates with the brake drum to form a substantially closed chamber in which the brake is housed.

An important feature of the invention relates to the form and arrangement of the brake-operating means, and which preferably comprises a novel equalizing linkage housed inside the brake chamber and shown as moving in a plane paralleling the brake plane, for example in the space between the backing plate and the webs of the shoes. This novel linkage may be operated by a rod which passes through the steering knuckle, by a crank and shaft or by a cable or other tension element which passes through the backing plate and through a flexible Bowden-type conduit.

In the illustrated embodiments of the invention, the novel linkage is shown as including a pair of radial levers at opposite sides of the brake, acting on the ends of the shoes adjacent the anchors, and both operated by an equalizing bar or other equalizing means so that the shoes are applied with equal pressure. I prefer to pivot each radial lever on the end of one of the shoes, and provide means such as a thrust connection extending from the lever to the end of the opposite shoe. This thrust connection extends past, and preferably through, the anchor and may have a shoulder engaging the face of the anchor opposite to the lever and through which said opposite shoe anchors.

Another important feature of the invention relates to providing the above-described brake with a simple wear adjustment, for example by making the above-described connection through the anchor in two parts which are adjustably connected. I prefer to form the part which is mounted in the opening in the anchor, and which has the shoulder seating against the anchor as a bolt or screw with external screw threads and thread thereon a nut which bears against said opposite shoe and may be turned to make the desired adjustment.

The above and other objects and features of the invention, including various novel combinations of parts and desirable particular constructions, will be apparent from the following description of the illustrative embodiments shown in the accompanying drawings, in which:

Figure 10 is a section corresponding to Figure 1, but showing a fourth embodiment.

Figure 11 is a section corresponding to Figure 1, but showing a fifth embodiment; and Figure 12 is a partial section on the line 12—12 of Figure 11 and showing the equalizing lever.

The brake illustrated in Figures 1-5 includes a rotatable drum 10, at the open side of which is a suitable support such as a backing plate 12 of stamped steel. The drum and backing plate cooperate to form a substantially closed brake chamber housing the friction means of the brake, here shown as two T-section brake shoes 14 and 16 made by welding together stamped steel rims and webs.

Figure 1:
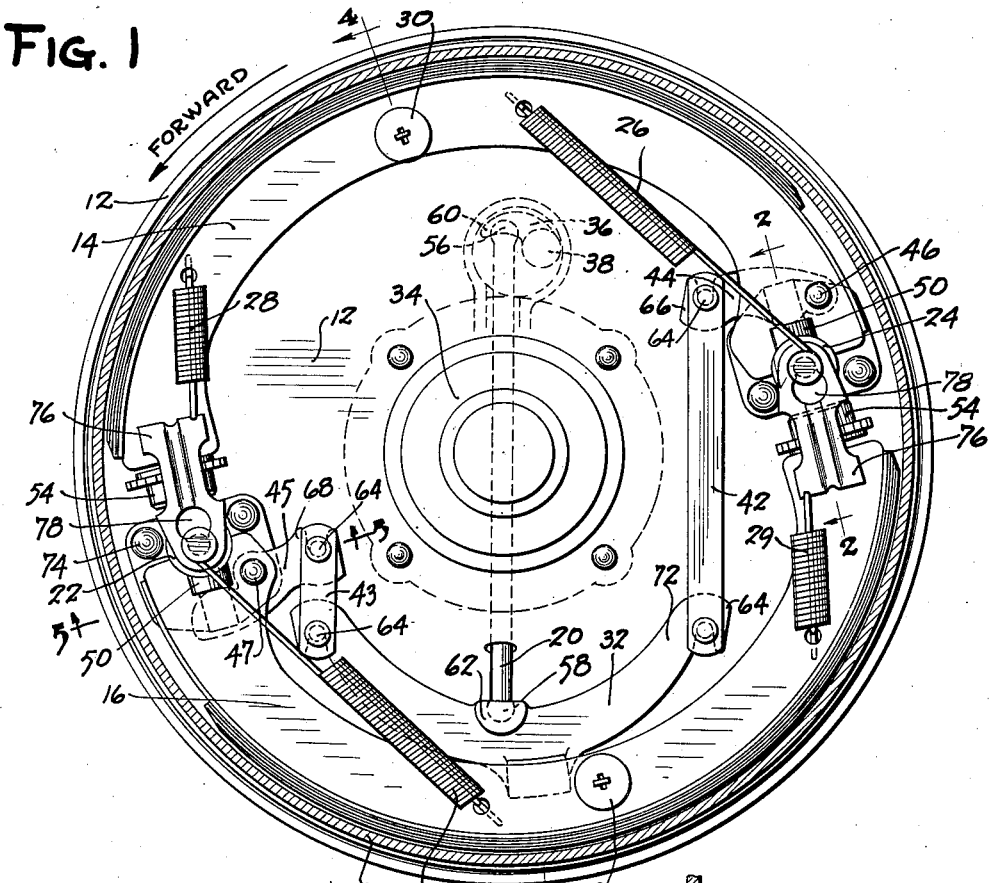
Figure 1 is a vertical section through a front brake, just inside the head of the brake drum, and showing the brake shoes in side elevation.
Figure 3:
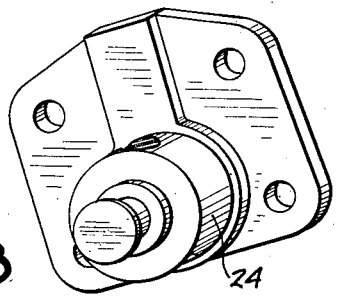
Figure 3 is a perspective of one of the brake anchors.
Figure 2:
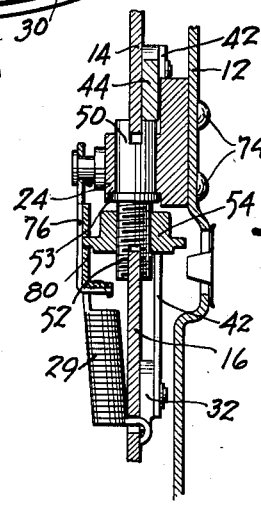
Figure 2 is a partial section on the line 2—2 of Figure 1, showing part of the novel anchor and applying arrangement linkage.
Figure 4:
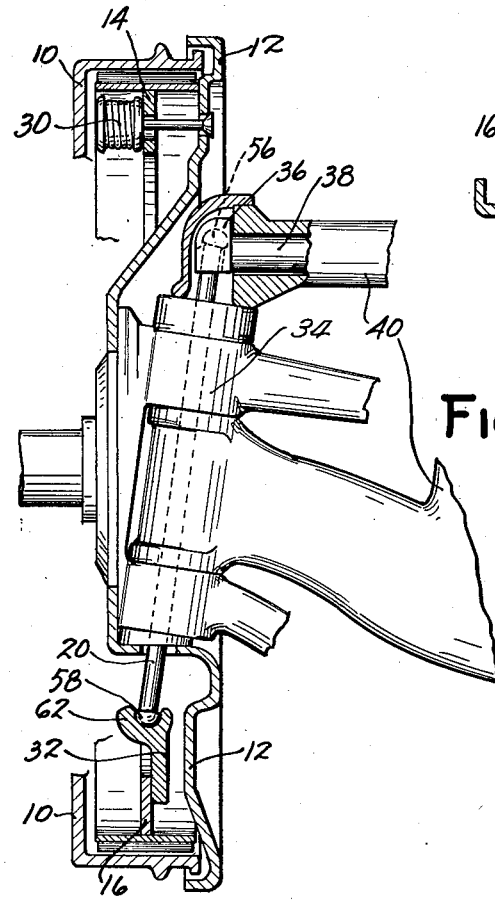
Figure 4 is a section on the line 4—4 of Figure 1.
Figure 5:
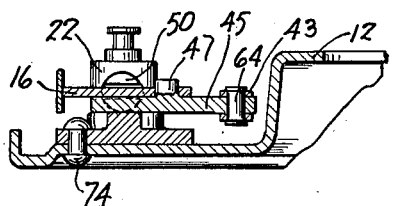
Figure 5 is a partial section on the line 5—5 of Figure 1.
Figure 8:
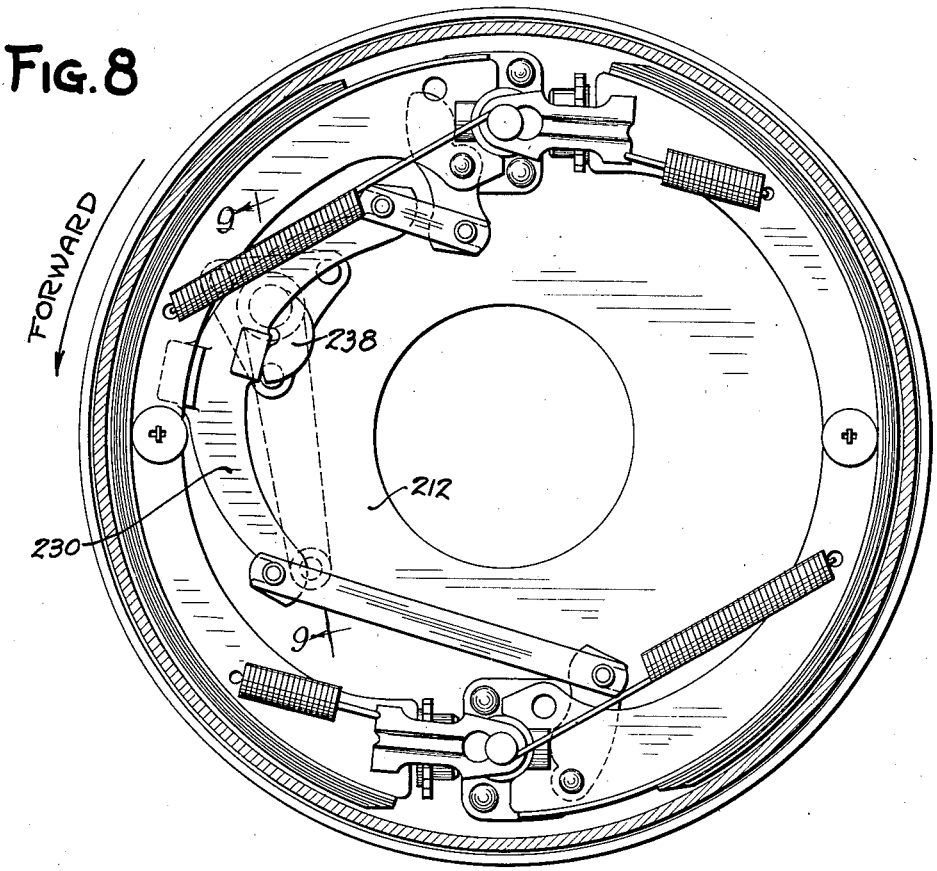
Figure 8 is a section corresponding to Figure 1, but showing the invention applied to a rear brake.
Figure 9:
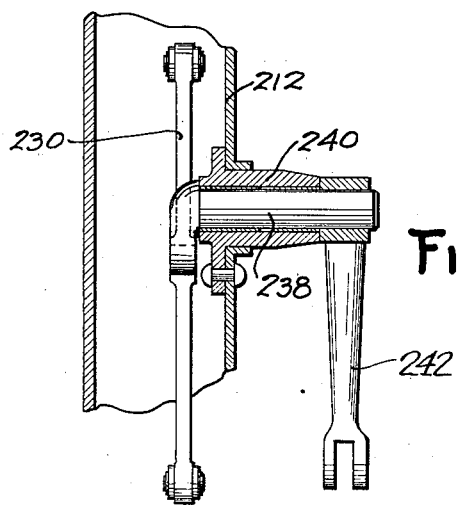
Figure 9 is a partial section on the line 9—9 of Figure 8, showing the actuating means.

The brake arranged as shown in Figure 1 is intended for use at a front wheel. For use on a rear wheel, a similar brake is used, like that shown except for such changes as are necessary. The rear brake is shown in Figures 8 and 9.

The braking torque of the shoes is taken by two anchors 22 and 24, carried by the backing plate and arranged between the ends of the shoes. Semicircular notches on the clockwise ends of the shoes contact with and partly encircle the cylindrical surface of the adjacent anchor, and accurately locate the shoe with respect to the drum when in released position. When the drum is turning clockwise (with the vehicle moving backward) shoe 14 anchors on the anchor 24 and shoe 16 anchors on the anchor 22. When the drum is turning counterclockwise (with the vehicle moving forward), shoe 14 anchors on the anchor 22 and the shoe 16 on the anchor 24. Thus in either case both shoes have a full self-energizing action, without, however, any compounding of the action of the one shoe on that of the other.

The shoes are applied, against the resistance of return springs 26, 27, 28, and 29, by a novel operating linkage described below, and which is arranged in the space between the backing plate and the shoe webs. The shoes are provided with suitable positioning means such as steady rests or the like 30.

The operating linkage, to which one feature of the invention relates, in the form shown in this embodiment, comprises a floating equalizing lever 32 adapted to be operated by a thrust pin 20 which extends through the steering knuckle 34. The upper end of the pin 20 is contacted by and is adapted to be operated by a lever end 36 of a one piece shaft and lever 38 journalled in a portion 40 of the axle.

The ends of the lever 32 are connected by means such as double links 42 and 43 to the ends of applying levers 44 and 45 pivoted at 46 and 47 on the ends of shoes 14 and 16 adjacent the anchors 24 and 22. It is to be noted that the arm of the lever 32 connected to links 42 is longer than the arm connected to the links 43.

The applying lever 44 pivoted on the shoe 14 acts as a lever of the first class in forward braking and adjacent its central portion has a thrust part which engages connecting means acting on the other shoe 16 and preferably passing through a transverse cylindrical opening in the anchor 24. The applying lever 45 pivoted on the shoe 16 acts as a lever of the second class in forward braking, and adjacent the end thereof opposite to the connection with the link 43 has a thrust part which also engages with similar means acting on the shoe 14 and preferably passing through the anchor 22. It is to be noted that the effective length of the levers 44 and 45 are different so that the offset thrust on the equalizing lever 32 is corrected. In both cases the connecting means includes a thrust part having a cylindrical end 50 journaled in the opening in the anchor and integral with a threaded portion 52. Intermediate the portions 50 and 52 is a shoulder 53 normally seated against the anchor. Threaded on the portion 52 is a serrated nut 54 adapted to be turned in adjusting the brake. The ends of the pin 20 are formed with spherical heads 56 and 58 which coact with spherical sockets 60 and 62 formed in the members 36 and 32 respectively, thus providing a universal thrust connection. The double links 42 and 43 are connected to each other at their ends by pins 64 which coact with the hooked ends 66 and 68 of the levers 44 and 45 respectively and with the hooked ends 70 and 72 of the floating equalizer lever 32.

The anchors 22 and 24 are secured to the backing plate 12 by rivets 74 and after being secured have their cylindrical anchoring surface accurately positioned relative to the drum and the center of the wheel by box milling the anchoring surfaces.

Means are provided for locking the nuts 54 adjustably in place and comprise stampings 76 hooked by a keyhole slot 78 to the end of the associated anchors 22 or 24 and carrying a ridge 80 adapted to fit in any one of the serrations of the nut 54.

Each of the tensioned return springs 26 and 27 is shown attached to one of the shoes at one end and at the other end to one of the anchors. Each of the springs 28 and 29 is shown attached to one of the shoes at one end, and at its other end to one of the stampings 76. The springs 28 and 29 being stronger than the springs 26 and 27, tend to maintain the shoes 14 and 16 against the anchors 22 and 24 respectively during the initial brake applying movement, in forward braking.

It will be seen that turning the nut 54 of one of the connecting devices described above, for example by inserting a tool through an opening in the backing plate, forces the corresponding thrust part 54 outwardly. This increases the effective length of the shoe engaged by the thrust member 54 to compensate for wear of the brake lining with which it is faced. It will be noted that this single adjustment adjusts both for engagement with the anchorage and for the applying means. In spite of the fact that the two shoes shift individually in the operation of the brake, only the one simple adjustment is needed at each brake.

In operation, force applied through the shaft and lever 38 acts through the pin 20, the floating lever 32, the links 42 and 43, and the levers 44 and 45 in a plane paralleling the plane of the brake and in the space between the backing plate and the shoe webs, to apply both shoes regardless of which ends of the shoes are anchored.

In each succeeding embodiment shown in the drawings, parts corresponding to those described above are designated by the same reference characters but with 100 or a multiple of 100 added.

Figure 7:
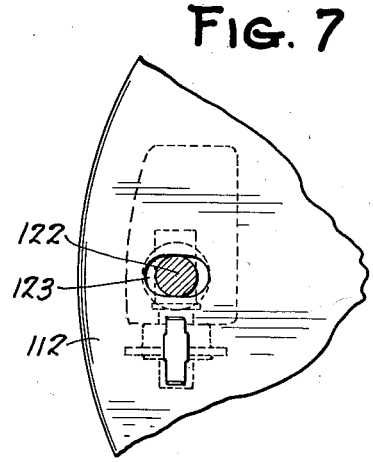
Figure 7 is a view in elevation of a portion of the brake shown in Figure 6.
Figure 6:
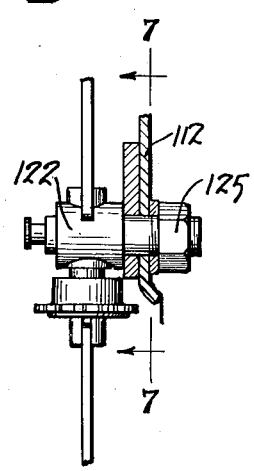
Figure 6 is a partial section corresponding to a portion of Figure 1, but showing a second embodiment of the invention.

The embodiment of Figures 6 and 7 differs from that described above principally in that the anchors 122 corresponding to anchors 22 and 24 are mounted in slots 123 and secured therein by nuts 125 so that the anchors may be adjustable radially during the initial assembly. Box milling is, therefore, unnecessary.

In the modification of Figures 8 and 9, the thrust pin 20 is omitted and the floating lever 230 operated directly by a one piece shaft 238 mounted in a bearing 240 secured to the backing plate 212 and having a lever portion 242.

In Figure 10 the floating lever 330 is operated by a cable operated lever 336 to which there is connected one end of a cable 338. The cable enters the brake chamber through an opening 339 formed in the backing plate 312 and preferably extends from said opening through a flexible conduit which thus forms a continuation of the brake enclosure.

In Figures 11 and 12, the floating equalizing lever 432 is carried on one end of the applying 2,084,400 lever 482 which is itself pivoted on the backing plate at 484. The lever 432 is pivoted on a pin 486 extending through the lever 482. One end of the lever 432 bears against an abutment formed on lever 444 which is pivoted at 446 on the shoe 414. The opposite end of the lever 432 is connected by a pin 488 to double links 490 connected by a pin 492 with applying lever 445. In this embodiment one end of each shoe is seated in a slot in a screw 452 having threaded thereon an adjustment nut 454 engaged by the corresponding operating lever. The nut 454 passes through an opening in anchor 424, and has a flat base seated against a corresponding flat surface on the anchor.

It is to be noted that in the brakes shown, in Figures 1 to 5 inclusive, 8 and 10 the springs 26 and 27, 226 and 227, and 326 and 327 have radial components which act in combination with the shape of the ends of the shoes to prevent the shoes from leaving the anchor in reverse braking. As previously explained, the other springs prevent the shoes from leaving the anchor in forward braking. Thus click is eliminated in both directions.

While several illustrative embodiments have been described in detail, it is not my intention to limit the scope of the invention to those particular embodiments, or otherwise than by the terms of the appended claims. It is not my intention to claim in the present application any subject-matter disclosed in my prior applications Nos. 532,265, 648,291 and 704,221, filed respectively April 23, 1931, December 21, 1932 and December 28, 1933, or in my application No. 734,249, filed July 9, 1934, which is a division of application No. 532,265, all of which applications disclose and claim improvements in brakes having shoes which are individually shiftable from one anchorage to another, in the general manner disclosed herein.

I claim:

1. A brake comprising in combination a pair of floating shoes, two anchors for said shoes interposed between the ends thereof, an adjustable part at one end of each shoe extending to the side of the corresponding anchor opposite said shoe, means on the other end of each shoe contacting with the portion of the respective part which extends beyond the adjacent anchor and tending to cause force to be transmitted through said adjustable part to the first mentioned end, and a floating applying lever for equalizing the pressures effective for applying the shoes.

2. A brake comprising in combination a pair of floating shoes, two anchors for said shoes interposed between the ends thereof, an adjustable part at one end of each shoe extending to the corresponding side of anchor opposite said shoe, means on the other end of each shoe contacting with the portion of the respective part which extends beyond the adjacent anchor and tending to cause force to be transmitted through said adjustable part to the first mentioned end, a floating applying lever for equalizing the pressures effective for applying the shoes, a steering knuckle, and a thrust pin extending through said steering knuckle.

3. A brake comprising in combination a pair of floating shoes, two anchors for said shoes interposed between the ends thereof, an adjustable part at one end of each shoe extending to the side of the corresponding anchor opposite said shoe, means on the other end of each shoe contacting with the portion of the respective part which extends beyond the adjacent anchor and tending to cause force to be transmitted through said adjustable part to the first mentioned end, a floating applying lever for equalizing the pressures effective for applying the shoes, and a thrust member acting on said floating lever at a point offset from the center thereof.

4. A brake comprising in combination a pair of floating shoes, two anchors for said shoes interposed between the ends thereof, an adjustable part at one end of each shoe extending to the side of the corresponding anchor opposite said shoe, means on the other end of each shoe contacting with the portion of the respective part which extends beyond the adjacent anchor and tending to cause force to be transmitted through said adjustable part to the first mentioned end, a shaft provided with a lever, means for rotating said shaft, and means for transmitting force from said lever equally to said shoes to apply said shoes with equal force.

5. A brake comprising in combination a pair of floating shoes, two anchors for said shoes interposed between the ends thereof, an adjustable part at one end of each shoe extending to the side of the corresponding anchor opposite said shoe, means on the other end of each shoe contacting with the portion of the respective part which extends beyond the adjacent anchor and tending to cause force to be transmitted through said adjustable part to the first mentioned end, said adjustable part comprising an externally threaded portion, and a nut threaded on said threaded portion.

6. A brake comprising in combination a pair of floating shoes, two anchors for said shoes interposed between the ends thereof, an adjustable part at one end of each shoe extending to the side of the corresponding anchor opposite said shoe, means on the other end of each shoe contacting with the portion of the respective part which extends beyond the adjacent anchor and tending to cause force to be transmitted through said adjustable part to the first mentioned end, a floating applying lever, a thrust member acting on said floating lever at a point offset from the center thereof, and applying levers connected to the ends of said floating lever having differing effective lengths for compensating for the offset thrust on the floating lever for equalizing the applying forces on said shoes.

7. A brake comprising in combination a pair of floating shoes, two anchors for said shoes interposed between the ends thereof, an adjustable part at one end of each shoe, a lever pivoted on the opposite end of each shoe and contacting with the adjustable part for the other shoe, and a floating applying lever for equalizing the pressures effective for applying the shoes.

8. A brake comprising in combination a pair of floating shoes, two anchors for said shoes interposed between the ends thereof, an adjustable part at one end of each shoe, a lever pivoted on the opposite end of each shoe and contacting with the adjustable part for the other shoe, a floating applying lever for equalizing the pressures effective for applying the shoes, a steering knuckle, and a thrust pin extending through said steering knuckle.

9. A brake comprising in combination a pair of floating shoes, two anchors for said shoes interposed between the ends thereof, an adjustable part at one end of each shoe, a lever pivoted on the opposite end of each shoe and contacting with the adjustable part for the other shoe, a floating applying lever for equalizing the pressures effective for applying the shoes, and a thrust member acting on said floating lever at a point offset from the center thereof.

10. A brake comprising in combination a pair of floating shoes, two anchors for said shoes interposed between the ends thereof, an adjustable part at one end of each shoe, a lever pivoted on the opposite end of each shoe and contacting with the adjustable part for the other shoe, a shaft provided with a lever, means for rotating said shaft, and means for transmitting force from said lever equally to said shoes to apply said shoes with equal force.

11. A brake comprising in combination a pair of floating shoes, two anchors for said shoes interposed between the ends thereof, an adjustable part at one end of each shoe, a lever pivoted on the opposite end of each shoe and contacting with the adjustable part for the other shoe, said adjustable part comprising an externally threaded portion, and a nut threaded on said threaded portion.

12. A brake comprising in combination a pair of floating shoes, two anchors for said shoes interposed between the ends thereof, an adjustable part at one end of each shoe, a lever pivoted on the opposite end of each shoe and contacting with the adjustable part for the other shoe, a floating applying lever, and a thrust member acting on said floating lever at a point offset from the center thereof, said levers pivoted on the shoes having unequal effective arms to compensate for the offset thrust on the floating applying lever to equalize the applying forces on said shoes.

13. A brake comprising in combination a drum, a pair of floating shoes adapted to anchor at either end, two anchors for said shoes interposed between the ends thereof and on either of which either of said shoes may anchor, a floating equalizing lever, a pair of applying levers for separating the ends of said shoes, and tension links connecting said applying levers to said equalizing lever, adjustable parts connected to one end of each shoe and positioned substantially opposite of the drum from each other, said levers being each pivoted on one of said shoes.

14. A brake comprising in combination a drum, a pair of floating shoes adapted to anchor at either end, two anchors for said shoes interposed between the ends thereof and on either of which either of said shoes may anchor, a floating equalizing lever, a pair of applying levers for separating the ends of said shoes, and tension links connecting said applying levers to said equalizing lever, adjustable parts connected to one end of each shoe and positioned substantially opposite of the drum from each other, said adjustable thrust parts comprising plungers each extending through one of said anchors.

15. A brake comprising in combination a drum, a pair of floating shoes adapted to anchor at either end, two anchors for said shoes interposed between the ends thereof and on either of which either of said shoes may anchor, a floating equalizing lever, a pair of applying levers for separating the ends of said shoes, and tension links connecting said applying levers to said equalizing lever, adjustable parts connected to one end of each shoe and positioned substantially opposite of the drum from each other, said adjustable thrust parts each comprising a threaded portion having a slot into which one of said shoes extends and a nut on said threaded portion bearing against said shoe.

16. A brake comprising in combination a drum, a pair of floating shoes adapted to anchor at either end, two anchors for said shoes interposed between the ends thereof and on either of which either of said shoes may anchor, a floating equalizing lever, a pair of applying levers for separating the ends of said shoes, and tension links connecting said applying levers to said equalizing lever, adjustable parts connected to one end of each shoe and positioned substantially opposite of the drum from each other, said anchors being adjustable radially of the drum.

17. A brake comprising in combination a drum, a pair of floating shoes adapted to anchor at either end, two anchors for said shoes interposed between the ends thereof and on either of which either of said shoes may anchor, a floating equalizing lever, a pair of applying levers for separating the ends of said shoes, and tension links connecting said applying levers to said equalizing lever, adjustable parts connected to one end of each shoe and positioned substantially opposite of the drum from each other, one of said levers being a lever of the first class and the other of said levers being a lever of the second class.

18. A brake comprising in combination a drum, a pair of floating shoes adapted to anchor at either end, two anchors for said shoes interposed between the ends thereof and on either of which either of said shoes may anchor, a floating equalizing lever, a pair of applying levers for separating the ends of said shoes, and tension links connecting said applying levers to said equalizing lever, adjustable parts connected to one end of each shoe and positioned substantially opposite of the drum from each other, each of said levers bearing upon a portion of one of the adjustable parts positioned on the opposite side of the anchor from the shoe to which the adjustable part is connected.

19. A brake comprising in combination, a drum, a pair of floating shoes adapted to anchor at either end, two anchors for said shoes interposed between the ends thereof on either of which either of said shoes may anchor, an applying lever, a floating lever pivotally mounted thereon, an actuating lever pivoted on each shoe, one of which contacts with an end of said floating lever, and a link pivoted to the other end of the floating lever and to the other actuating lever.

LUDGER E. LA BRIE.